(12) United States Patent
Shknevsky et al.

(10) Patent No.: US 11,663,080 B1
(45) Date of Patent: May 30, 2023

(54) TECHNIQUES FOR PERFORMING LIVE REBUILD IN STORAGE SYSTEMS THAT OPERATE A DIRECT WRITE MODE

(71) Applicant: Dell Products L.P., Round Rock, TX (US)

(72) Inventors: Alexander Shknevsky, Beer-Sheva (IL); Oran Baruch, Tel Aviv (IL); Vamsi K. Vankamamidi, Hopkinton, MA (US); David Ben-David, Beer Sheva (IL); Maor Rahamim, Ramla (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/579,866

(22) Filed: Jan. 20, 2022

(51) Int. Cl.
  *G06F 11/07* (2006.01)
  *G06F 11/10* (2006.01)
  *G06F 11/14* (2006.01)
  *G06F 3/06* (2006.01)

(52) U.S. Cl.
  CPC .......... *G06F 11/1084* (2013.01); *G06F 3/064* (2013.01); *G06F 3/0619* (2013.01); *G06F 3/0659* (2013.01); *G06F 3/0689* (2013.01); *G06F 11/0772* (2013.01); *G06F 11/1092* (2013.01); *G06F 11/1435* (2013.01)

(58) Field of Classification Search
  CPC ............. G06F 11/1084; G06F 11/1092; G06F 11/1435; G06F 11/0772; G06F 3/0619; G06F 3/064; G06F 3/0659; G06F 3/0689
  USPC ................................................ 714/6.22, 6.24
  See application file for complete search history.

(56) References Cited

U.S. PATENT DOCUMENTS

| | | |
|---|---|---|
| 10,545,668 B2 | 1/2020 | Feng et al. |
| 10,552,322 B2 | 2/2020 | Hu et al. |
| 11,163,449 B2 | 11/2021 | Faibish et al. |
| 11,210,228 B2 | 12/2021 | Zhang et al. |

(Continued)

FOREIGN PATENT DOCUMENTS

JP   2011164714 A   *   8/2011   ............. G06F 12/16

OTHER PUBLICATIONS

Shveidel, Vladimir, et al.; "One Path Metadata Page Reconstruction With No Dynamical Memory Allocation for Delta-Log Based Storage," U.S. Appl. No. 17/355,548, filed Jun. 23, 2021.

(Continued)

*Primary Examiner* — Chae M Ko
(74) *Attorney, Agent, or Firm* — BainwoodHuang

(57) ABSTRACT

Techniques for rebuilding data in a data storage system are provided. A method includes: (a) identifying (i) a first set of degraded Ubers that contain no portions reserved for direct writing and (ii) a second set of degraded Ubers that contain at least one portion reserved for direct writing. Direct writing is a process that writes blocks to long-term storage prior to mapping those blocks in a metadata mapping structure. An Uber is a set of adjacent stripes across a respective Redundant Array of Independent Disks (RAID) array of the data storage system, and a degraded Uber is an Uber that includes at least one failed drive within its RAID array. The method further includes (b) initiating a rebuild of the first set of degraded Ubers; and (c) delaying a rebuild of each degraded Uber of the second set until all pending direct writes to blocks of that degraded Uber have been mapped by the metadata mapping structure.

20 Claims, 3 Drawing Sheets

(56) References Cited

U.S. PATENT DOCUMENTS

| | | | |
|---|---|---|---|
| 2016/0062837 A1* | 3/2016 | Slik | G06F 11/1092 |
| | | | 714/6.24 |
| 2020/0133809 A1* | 4/2020 | Han | G06F 3/0689 |
| 2021/0133047 A1* | 5/2021 | Armangau | G06F 11/1084 |
| 2021/0232450 A1* | 7/2021 | Vankamamidi | G06F 11/0727 |

OTHER PUBLICATIONS

Shveidel, Vladimir, et al.; "Adaptive Turbo Toggling," U.S. Appl. No. 17/198,551, filed Mar. 11, 2021.

* cited by examiner

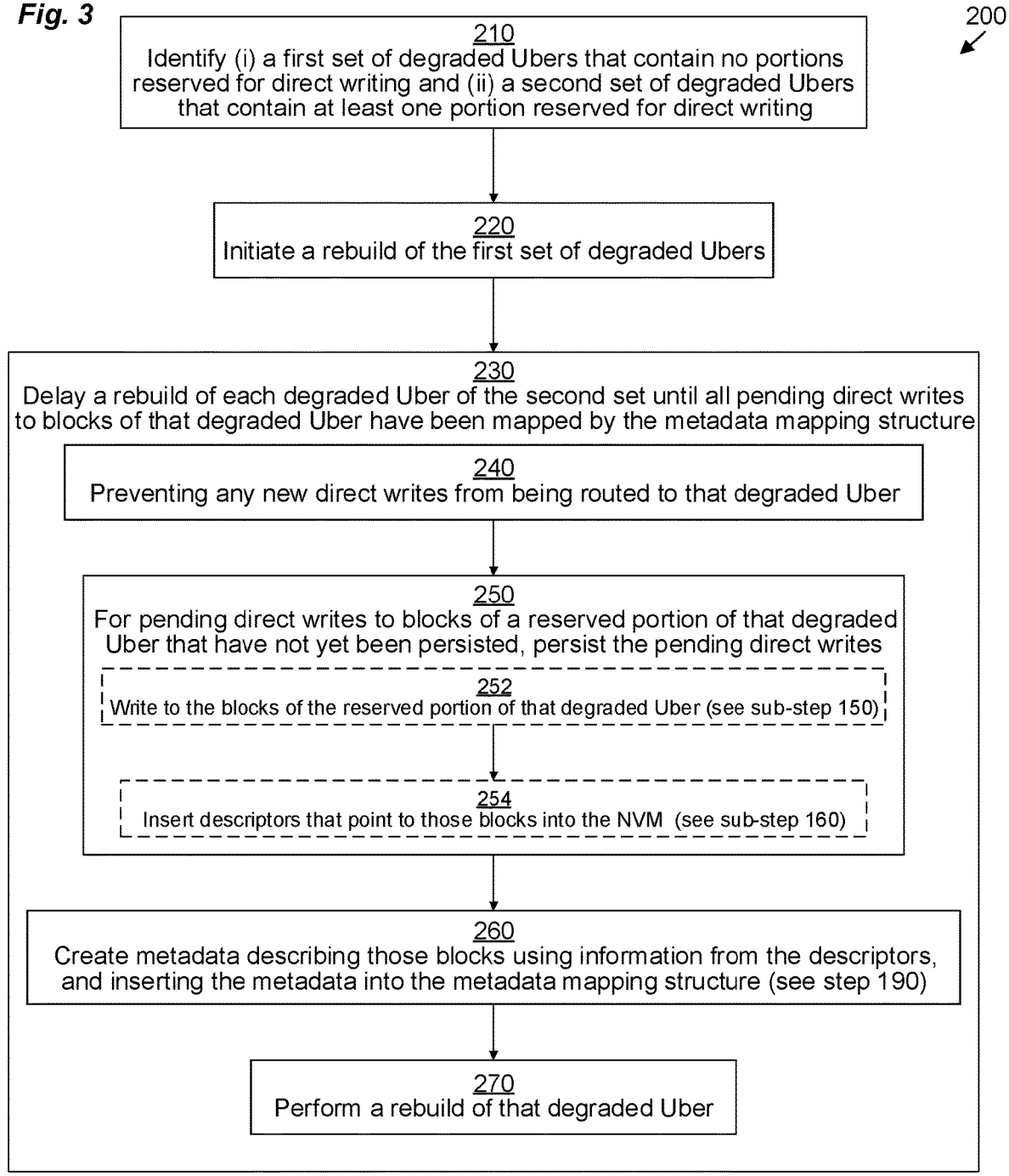

US 11,663,080 B1

TECHNIQUES FOR PERFORMING LIVE REBUILD IN STORAGE SYSTEMS THAT OPERATE A DIRECT WRITE MODE

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems include a high-speed non-volatile cache into which all writes are persisted upon receipt in order to ensure that the writes are secured against power failure. This may be the case even when the system operates in a write-back mode, where writes are acknowledged prior to being completed, once they are stored in the high-speed non-volatile cache. Eventually, a flushing process transfers the writes from the non-volatile cache into long-term persistent storage, while also creating metadata (e.g., mapping metadata) for accessing the data in the long-term persistent storage.

Some storage systems store data across a plurality of drives using striping techniques, such as Redundant Array of Independent Disk (RAID) technology. RAID technology provides redundancy in the form of mirroring and/or parity, such that data can be recovered even in the event of a drive failure. Mapped RAID techniques allow stripes of V disk extents to be dynamically spread across U disks, U>V. Particular extents can be rearranged or rebuilt onto different disks as needed. Some systems are able to perform such rebuilding while the system remains online and even provide access to data on stripes that include failed disks.

SUMMARY

Although the above-described systems perform well, throughput may not always be sufficient to keep up with incoming writes due to bandwidth limitations associated with non-volatile cache. Some newer storage systems can operate in a turbo direct write mode that directly writes incoming data into long-term persistent storage without first caching it in non-volatile cache. Data stored in long-term persistent storage is eventually "flushed" by creating metadata for accessing the data in the long-term persistent storage, e.g., by establishing mapping pointers between logical blocks and corresponding physical blocks on storage drives. But, for some amount of time prior to flushing, such metadata is not yet available. Instead, special descriptors are stored in the non-volatile cache to keep track of data locations.

In the event of a failure of a drive in a RAID array, a rebuild process may be invoked to rebuild extents from the failed drives. Such rebuilding involves reference to metadata, such as information indicating whether an extent was written while in a degraded state (e.g., while one of the drives in the RAID array has failed and has not yet been replaced with another drive). Such information is used to identify extents to be rebuilt and where to find the associated data. However, because data written in the turbo direct write mode may not yet have any associated metadata (e.g., if it was not yet flushed), the rebuild process is not able to properly rebuild such extents.

Thus, it would be desirable to implement a rebuild process that is able to work properly with data that was written in the turbo direct write mode. This may be accomplished, at least in part, by identifying degraded portions of persistent storage that were used for direct writing and delaying rebuilding those degraded portions until such portions are flushed to create mapping metadata for those portions. Meanwhile, other degraded portions of persistent storage that were not used for direct writing may be rebuilt without delay. In some embodiments, a bitmap may be created for every write to long-term persistent storage. The bitmap identifies which drives were in a degraded state at the time of writing and may be stored in conjunction with the descriptors in the non-volatile memory. Several of these bitmaps can then be logically combined in the creation of the metadata during the flushing process.

In one embodiment, a method of rebuilding data in a data storage system is provided. The method includes (a) identifying (i) a first set of degraded Ubers that contain no portions reserved for direct writing and (ii) a second set of degraded Ubers that contain at least one portion reserved for direct writing. Direct writing is a process that writes blocks to long-term storage prior to mapping those blocks in a metadata mapping structure. An Uber is a set of adjacent stripes across a respective Redundant Array of Independent Disks (RAID) array of the data storage system, and a degraded Uber is an Uber that includes at least one failed drive within its RAID array. The method further includes (b) initiating a rebuild of the first set of degraded Ubers; and (c) delaying a rebuild of each degraded Uber of the second set until all pending direct writes to blocks of that degraded Uber have been mapped by the metadata mapping structure. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 3 is a flowchart depicting an example procedure according to various embodiments.

DETAILED DESCRIPTION OF THE INVENTION

Embodiments are directed to implementing a rebuild process that is able to work properly with data that was written in a turbo direct write mode. This may be accomplished, at least in part, by identifying degraded portions of persistent storage that were used for direct writing and delaying rebuilding those degraded portions until such portions are flushed to create mapping metadata for those portions. Meanwhile, other degraded portions of persistent storage that were not used for direct writing may be rebuilt without delay. In some embodiments, a bitmap may be created for every write to long-term persistent storage. The bitmap identifies which drives were in a degraded state at the time of writing and may be stored in conjunction with the descriptors in the non-volatile memory. Several of these bitmaps can then be logically combined in the creation of the metadata during the flushing process.

Figure 1:
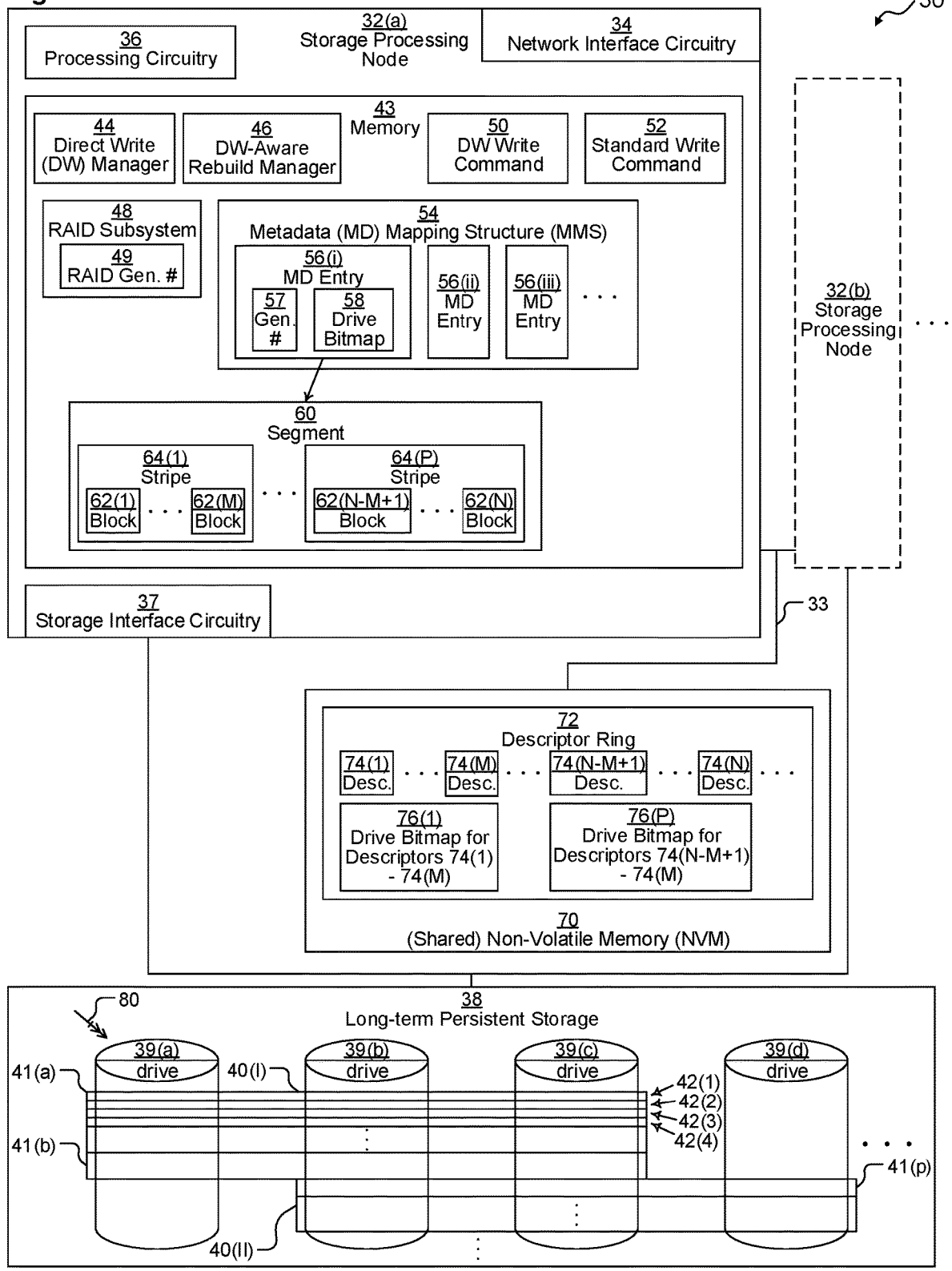
FIG. 1 is a block diagram depicting an example system, apparatus, and data structure arrangement for use in connection with various embodiments.

FIG. 1 depicts an example data storage system (DSS) 30 for use in connection with various embodiments. DSS 30 includes one or more storage processing nodes 32 (depicted as storage processing nodes 32(a), 32(b), ... ), non-volatile memory (NVM) 70, and long-term persistent storage 38. NVM 70 may include, for example, Intel Optane memory, bit- or byte-addressable flash storage, etc. In some embodiments, NVM 70 may be shared or mirrored between nodes 32.

The one or more storage processing nodes 32 at least includes first node 32(a). A storage processing node 32 may be any kind of computing device, such as, for example, a personal computer, workstation, server computer, enterprise server, data storage array device, laptop computer, tablet computer, smart phone, mobile computer, etc. In an example embodiment, storage processing node 32 may be a data storage appliance configured to provide access to long-term persistent storage 38.

A node 32 may include network interface circuitry 34, processing circuitry 36, storage interface circuitry 37, and memory 43. A node 32 may also include various additional features (not depicted) as is well-known in the art, such as, for example, user interface circuitry, interconnection buses, etc.

Processing circuitry 36 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above.

Storage interface circuitry 37 controls and provides access to long-term persistent storage 38. Storage interface circuitry 37 may include, for example, SCSI, SAS, ATA, SATA, FC, M.2, U.2, and/or other similar controllers and ports. Long-term persistent storage 38 includes a plurality of non-transitory persistent storage drives 39 (depicted as drives 39(a), 39(b), 39(c), 39(d), ... ), such as, for example, hard disk drives, solid-state storage drives (SSDs), flash drives, etc.

Drives 39 may be arranged in accordance with a Redundant Array of Independent Disks (RAID) configuration. For example, Mapped RAID techniques may be used in order to allow different Ubers 40 to be striped across different collections of drives 39. For example, as depicted, a first Uber 40(I) is a 2+1 RAID-5 array striped across drives 39(a), 39(b), 39(c), while a second Uber 40(II) is a 2+1 RAID-5 array striped across drives 39(b), 39(c), 39(d). An Uber 40 is a set of adjacent stripes (not depicted) that are all striped across a single RAID array. Although Ubers 40(I), 40(II) are both depicted as using a 2+1 RAID-5 configuration, other RAID configurations are also possible, such as, for example, 4+1 RAID-5, 8+1 RAID-5, 20+1 RAID-5, 8+2 RAID-6, 16+2 RAID-6, and 32+2 RAID-6. The size of an Uber 40 may vary from embodiment to embodiment, but in various example embodiments, an Uber 40 ranges from approximately 256 megabytes (MB) up to approximately 256 gigabytes (GB) in size (excluding space dedicated to parity). In one example embodiment, an Uber 40 may be 64 GB. Typically all Ubers 40 in DSS 30 are the same size as each other.

Each Uber 40 may be divided into a plurality of storage segments 42 (depicted as segments 42(1), 42(2), 42(3), 42(4), ... ). A storage segment 42 is also a set of adjacent stripes that are all striped across a single RAID array, but a storage segment 42 is several orders of magnitude smaller than an Uber 40. The size of a segment 42 may vary from embodiment to embodiment, but in various example embodiments, a segment 42 ranges from approximately 1 MB up to approximately 8 MB in size (excluding space dedicated to parity). In one example embodiment, a segment 42 may be 2 MB. Typically all segments 42 in DSS 30 are the same size as each other.

In some embodiments, each Uber 40 may also be divided into portions 41. For example, Uber 40(I) is divided into two portions 41(a), 41(b). A portion 41 is a fixed fraction of an Uber 40 that is made up of a plurality of segments 42. The fixed fraction may vary from embodiment to embodiment, but in various example embodiments, a portion 41 is between $1/16$ and 1. In an example embodiment in which an Uber 40 is 64 GB and the fixed fraction is $1/8$, each portion 41 is 8 GB.

Network interface circuitry 34 may include one or more Ethernet cards, cellular modems, Fibre Channel (FC) adapters, InfiniBand adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc.

Memory 43 may include any kind of digital system memory, such as, for example, random access memory (RAM). Memory 43 stores an operating system (OS, not depicted, e.g., a Linux, UNIX, Windows, MacOS, or similar operating system) and various drivers (e.g., storage drivers, not depicted) in operation. Memory 43 also stores a Direct Write (DW) manager 44, a DW-aware rebuild manager 46, and a RAID subsystem 48 in operation, as well as various other software modules (not depicted) which each execute on processing circuitry 36.

Memory 43 also stores a metadata (MD) mapping structure (MMS) 54, which may also be replicated in NVM 70 or on long-term persistent storage 38.

In operation, a node 32 receives storage commands from a remote host device via network interface circuitry 34. These storage commands may include read commands (not depicted) as well as write commands 50, 52.

A standard write command 52 requests that data (not depicted) of the standard write command 52 be stored to persistent storage 38 in a normal operating mode in which the data is first persisted to NVM 70 together with a descriptor 74 for each block of the data. In some embodiments, the descriptors 74 are stored in a descriptor ring structure 72, which is a circular journal. Once a descriptor 74 is stored in the descriptor ring structure 72, it may not be modified until it is invalidated, at which point it can only be re-used for another storage operation. After the data is persisted to NVM 70 together with a descriptor 74 for each block of the data, the data is placed into a segment 60 within memory 43, which is then flushed to long-term persistent storage 38 as a persisted segment 42 once the segment 60 is full. In addition, a MD entry 56 is created and placed within MMS 54. This MD entry 56 points to the newly-persisted segment 60, 42. Since the entire segment 60 is written to segment 42 at once, in a single write operation, the state of the drives 39 is the same for all blocks 62 of the segment 60.

The state of the drives 39 refers to whether the drives 39 that make up the Uber 40 on which the segment 42 is stored are in a degraded state or not. In the case of segment 42(1), since it is on Uber 40(I), which is striped across drives 39(a), 39(b), 39(c), the state of the drives 39 may be a bitmap 58 that indicates whether each of drives 39(a), 39(b), 39(c) was degraded. For example, if a failure event 80 occurs to drive 39(a) as segment 42(1) is being written to (as part of fulfilling a standard write command 52), then the bitmap 58 stored within the MD entry 56 for segment 42(1) would be "100," indicating that drive 39(a) was degraded, but drives 39(b), 39(c) were not degraded.

MD entry 56 may also include a generation number 57 that indicates a count of how many times an Uber 40 has been rebuilt as of the time that the MD entry 56 was created. If the generation number 57 of a segment 42 equals a RAID generation number 49 stored within the RAID subsystem 48 for the Uber 40 on which that segment 42 is located, then bitmap 58 may be useful in determining whether or not that segment 42 needs to be rebuilt (i.e., if the bitmap 58 includes any non-zero values). If the generation numbers 57, 49 differ, then that segment 42 needs to be rebuilt regardless of the bitmap 58. The generation number 57 and bitmap 58 may also be used for read operations, to determine which drives 39 should be read from when reading data from a segment 42.

It should be understood that a "block" of data is a fixed quantity of data to be stored on disk, as is well-known in the art. A block may be of any size, but typically a block has a size that is a power of two within the range of 512 bytes to 64 KB. In a typical modern DSS 30, a block is either 4 KB or 8 KB. In some embodiments, blocks 62 placed within a segment 60 in response to a standard write command 52 may be compressed to allow more blocks 62 to be stored within a segment 60.

A DW write command 50 requests that data (not depicted) of the DW write command 50 be stored to persistent storage 38 in a special operating mode (which may be called a "Direct Write" or "Turbo" mode) in which the data is persisted directly to long-term persistent storage 38 without first being stored in NVM 70. However, a descriptor 74 for each block of the data is still stored within NVM 70. DW write commands are processed by DW manager 44 in operation.

Although it has been described as the data being persisted "directly to long-term persistent storage 38," typically, the data is first accumulated within blocks 62 of a segment 60 in memory 43 until enough blocks 62 have been placed in memory 43 to fill a single stripe 64 across drives 39. As depicted in FIG. 1, a stripe 64 contains M blocks 62. For example, in an embodiment in which a block 62 is 4 KB, an Uber 40 is striped across 4 drives 39 for data (e.g., in a 4+1 RAID-5 configuration or a 4+2 RAID-6 configuration), and the smallest allowable write to a drive 39 is 32 KB, a stripe 64 is 128 KB, and M is equal to 32. Once a stripe 64 is filled, the stripe 64 is written to a segment 42 of persistent storage 38 in a single atomic write operation.

Since each stripe 64 is written to segment 42 at once, in a single write operation, the state of the drives 39 is the same for all blocks 62 of the stripe 64, but the state of the drives 39 may vary between different stripes 64 even within a single segment. Thus, a separate bitmap 76 may be stored to NVM 70 for each stripe 64. In some embodiments, the entirety of the bitmap 76 may be stored as part of each descriptor 74. In other embodiments, as depicted, one bitmap 76 for each stripe may be stored in connection with all of the descriptors 74 for that stripe 64. In some embodiments, a bitmap 76 (also bitmap 58) may be 32 bits long, allowing for RAID arrays that use up to 32 data drives (e.g., 32+2 RAID-6). In one embodiment in which M=32, one bit of the bitmap 76 is stored within each of 32 consecutive descriptors 74. In another embodiment in which M=32 as well, groups of 32 descriptors 74 are associated with a single bitmap 76 for that entire group of 32 descriptors 74. Thus, descriptors 74(1), . . . , 74(M) are associated with bitmap 76(1), and descriptors 74(N−M+1), . . . , 74(N) are associated with bitmap 76(M).

Thus, for example, at a first time, when a first stripe 64(1) is written to a segment 42(1) of long-term persistent storage 38 while all of the drives 39(a), 39(b), 39(c) are in working order, bitmap 76(1) is stored to NVM 70 with all zeroes. Then, at a second time, after a failure event 80 occurs to drive 39(a), when a second stripe 64(2) is written to the segment 42(1), bitmap 76(2) is stored to NVM 70 with a value of "100" since drive 39(a) was degraded during that write operation. If, however, drive 39(a) goes back online right after the second stripe 64(2) is written to the segment 42(1), then at a third time, when a third stripe 64(3) is written to segment 42(1), since all of the drives 39(a), 39(b), 39(c) are in working order again, bitmap 76(3) is stored to NVM 70 with all zeroes.

Subsequently, once the entire portion 41(a) of segment 42(1) has been filled with data from DW write commands 50, a flushing process is performed on the portion 41(a) wherein MD entries 56 are created and stored within MMS 54 for each segment 42 stored on that portion 41(a). The drive bitmap 58 for each MD entry 56 is created by logically OR-ing together all the bitmaps 76 stored in conjunction with the descriptors 74 of all the blocks 62 stored within a particular segment 42 associated with that MD entry 56. For example, if bitmaps 76(1), 76(2), 76(3) are logically OR-ed together, the result is "000" V "100" V "000"="100," so the segment-level bitmap 58 would be "100," indicating that only drive 39(a) was degraded at any point while the segment 42 was written. The generation number 57 may be assigned the current value of the RAID generation number 49.

When a drive 39(a) has failed such that it needs to be rebuilt (e.g., once a drive 39 stops working for a threshold amount of time, such as 5 minutes), DW-aware rebuild manager 46 operates to rebuild the Ubers 40 include the failed drive 39(a) on a segment-by-segment basis. See below in connection with FIG. 3.

Memory 43 may also store various other data structures used by the OS, modules 42, 46, 48 and various other applications and drivers. In some embodiments, memory 43 may also include a persistent storage portion. Persistent storage portion of memory 43 may be made up of one or more persistent storage devices, such as, for example, magnetic disks, flash drives, solid-state storage drives, or other types of storage drives. Persistent storage portion of memory 43 or persistent storage 38 is configured to store programs and data even while the DSS 30 or a node 32 is powered off. The OS, modules 42, 46, 48 and various other applications and drivers are typically stored in this persistent storage portion of memory 43 or on persistent storage 38 so that they may be loaded into a system portion of memory 43 upon a system restart or as needed. The OS, modules 42, 46, 48 and various other applications and drivers, when stored in non-transitory form either in the volatile or persistent portion of memory 43 or on persistent storage 38, each form a computer program product. The processing circuitry 36 running one or more applications thus forms a specialized circuit constructed and arranged to carry out the various processes described herein.

Figure 2:
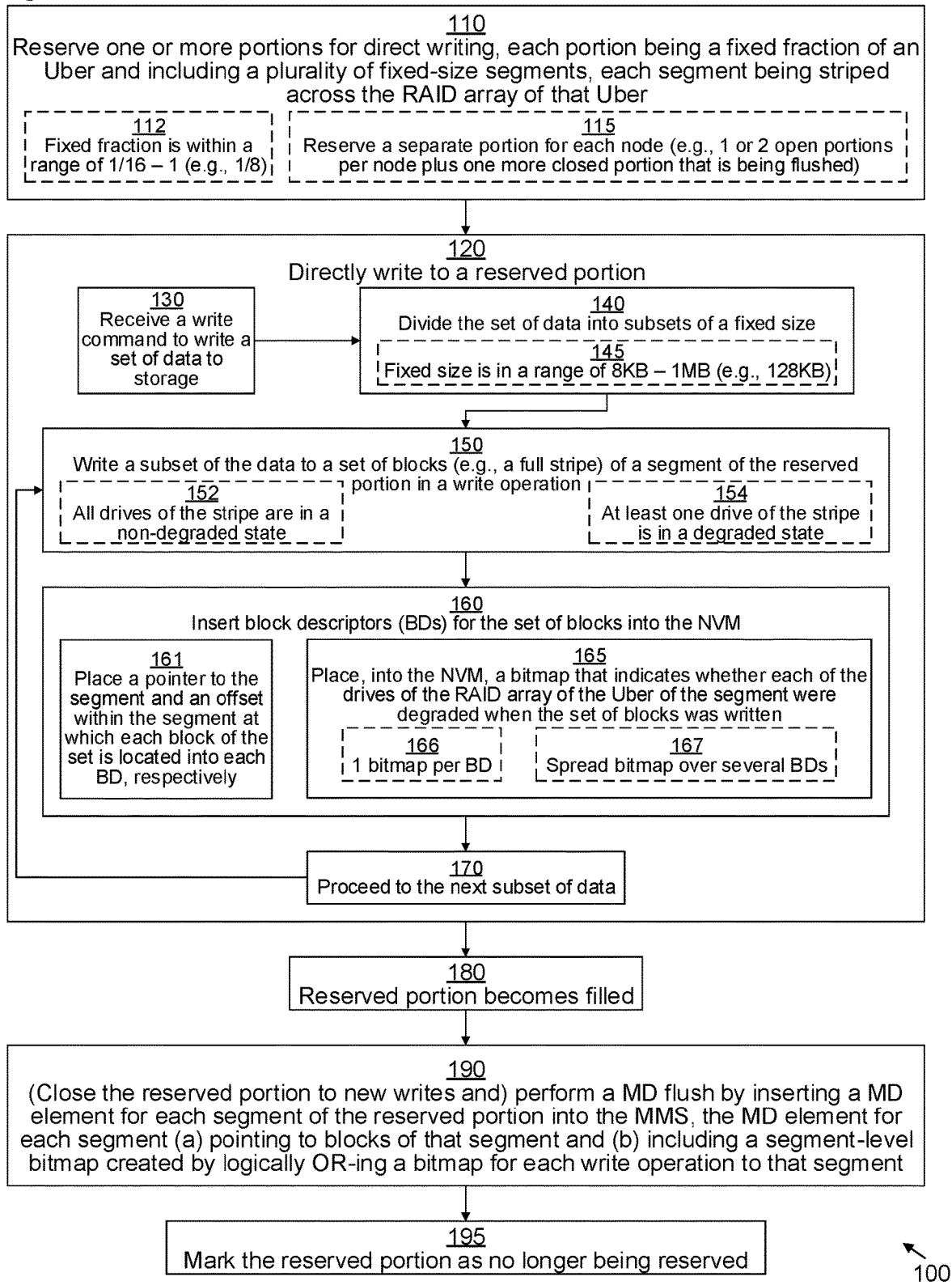
FIG. 2 is a flowchart depicting an example procedure according to various embodiments.

FIG. 2 illustrates an example method 100 performed by a storage processing node 32 for storing data in a DSS 30 using a DW mode such that live rebuilding is possible. It should be understood that any time a piece of software (e.g., OS, modules 42, 46, 48 etc.) is described as performing a method, process, step, or function, what is meant is that a computing device (e.g., processing node 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, DW manager 44 reserves one or more portions 41 for direct writing, each portion 41 being a fixed fraction of an Uber 40 and including a plurality of fixed-size segments 42, each segment 42 being striped across the RAID array of that Uber 40. Sub-step 112 indicates that the fixed fraction is within a range of 1/16 to 1, with a typical value of 1/8.

In sub-step 115, DW manager 44 reserves a separate portion 41 for each node 32. For example, in one embodiment, DW manager 44 might assign one portion 41 to each of nodes 32(a), 32(b). In another embodiment, DW manager 44 might assign two portions 41 to each of nodes 32(a), 32(b) so that each node 32 can perform direct writes to two different groups of drives 39 in parallel, for increased bandwidth. In another embodiment, DW manager 44 may assign three portions 41 to a single node 32 even if that node 32 only performs direct writes in parallel to two different groups of drives 39 because one portion 41 may be closed to new direct writes after it has become full but before all of its descriptors 74 have been flushed to MD entries 56.

In some embodiments, DW manager 44 effects the reservation by assigning a flag (not depicted) to a portion 41. For example, if a first portion 41(a) is assigned to node 32(a) for direct writing, then DW manager 44 might assign a flag "Da" to portion 41(a), while if a second portion 41(b) is assigned to node 32(a) for direct writing, then DW manager 44 might assign a flag "Db" to portion 41(b). If another portion 41(p) is assigned to node 32(a) for standard writing, then DW manager 44 might assign a flag "Sa" to portion 41(p). In one embodiment, these flags may be stored in a data structure (not depicted) kept for each portion 41, while in another embodiment, these flags may be stored in a database (not depicted).

In step 120, DW manager 44 directly writes to a reserved portion 41. Step 120 may include sub-steps 130-170.

In sub-step 130, DW manager 44 receives a DW write command 50 to write a set of data to persistent storage 38. In response, in sub-step 140, DW manager 44 divides the set of data into subsets (not depicted) of a fixed size (e.g., M multiplied by a block size of the DSS 30). In example embodiments, sub-step 145 specifies that the fixed size is within a range of 8 KB to 1 MB. For example, 128 KB may be a typical value. For example, each subset of the data may make up one stripe 64 in memory 43. If the data does not evenly divide into subsets of the fixed size, then the last subset may be incomplete, and it may be combined together with another incomplete subset from another DW write command 50.

Then, proceeding from the first subset of the received data, in sub-step 150, DW manager 44 writes one of the subsets (e.g., a stripe 64) of the data to a set of blocks of a segment 42 of the reserved portion 41 in a single atomic write operation. For example, this single write operation may be a full stripe write across one stripe of the segment 42. In one situation (sub-step 152), all of the drives 39 that make up the stripe are in a non-degraded state. In another situation (sub-step 154), at least one drive 39 of the stripe is in a degraded state.

Then, in sub-step 160, DW manager 44 inserts block descriptors (BDs, also called descriptors) 74 for the blocks into the NVM 70 (e.g., within descriptor ring 72). In some embodiments, sub-step 160 may be performed in parallel with or concurrently with sub-step 150. Sub-step 160 may include sub-steps 161, 165.

In sub-step 161, DW manager 44 places a pointer to the segment 42 within which the subset was stored (in sub-step 150) into the descriptors 74 (e.g., descriptors 74(1)-74(M). DW manager 44 also places an offset within the segment 42 at which each block is located into each descriptor 74, respectively. Thus, for example, descriptor 74(1) stores an offset of 1 (or 1 minus 1=0) to indicate the location on persistent storage 38 where block 62(1) was stored, descriptor 74(2) stores an offset of 2 (or 2 minus 1=1) to indicate a pointer to the location on persistent storage 38 where block 62(2) was stored, etc.

In sub-step 165, DW manager 44 places, into the NVM 70, a bitmap 76 that indicates whether each of the drives 39 of the RAID array of the Uber 40 of the segment 41 were degraded when the set of blocks was written (in sub-step 150). Depending on the embodiment, sub-step 165 may either include sub-step 166 or sub-step 167. In sub-step 166, DW manager 44 stores a separate bitmap 76 in each descriptor 74. In sub-step 167, DW manager 44 spreads out a bitmap 76 across multiple descriptors 74, either within each of several descriptors 74 (e.g., 1 bit per descriptor 74, 4 bits per descriptor 74, 8 bits per descriptor 74, etc.) or stored separately from the descriptors 74 but associated therewith.

Then, in sub-step 170, operation returns back to sub-step 150 for another subset of the data. Steps 130-170 may be repeated for each of several DW write commands 50.

In step 180, after repeating step 170 multiple times, the reserved portion 41 becomes full. In response, in step 190, DW manager 44 performs a MD flush process by inserting a MD element (e.g., MD entry 56) for each segment 42 of the reserved portion 41 into the MMS 54, the MD element 56 for each segment 42 (a) pointing to blocks of that segment 42 within persistent storage 38 and (b) including a segment-level bitmap 58 created by logically OR-ing together a bitmap 76 (read from NVM 70) for each write operation to that segment 42. In some embodiments, DW manager 44 also assigns the current value of the RAID generation number 49 to the generation number 57. In some embodiments DW manager 44 also closes the reserved portion 41 to new DW write commands 50, possibly also reserving another portion 41 for fulfilling such new DW write commands 50.

After step 190 has completed, DW manager 44 marks the reserved portion 41 as no longer being reserved for direct writing, since it has now been fully persisted and flushed.

FIG. 3 depicts an example method 200 performed by DW-aware rebuild manager 46 for rebuilding data in a DSS 30 in accordance with various embodiments. In some embodiments, method 200 may be performed in response to a failure event 80. In other embodiments, method 200 may be performed in response to a threshold amount of time elapsing after a failure event 80. For example, if failure event 80 is due to a connection (e.g., a data connection or a power connection) becoming loose, an administrator may be able to correct the problem. Thus, for example, method 200 may be triggered once 5 or 10 minutes elapse after a failure event 80 without being corrected.

In step 210, DW-aware rebuild manager 46 identifies (i) a first set of degraded Ubers 40 that contain no portions 41 reserved for direct writing and (ii) a second set of degraded Ubers 40 that contain at least one portion 41 reserved for direct writing.

In step 220, DW-aware rebuild manager 46 initiates a rebuild of the Ubers 40 of the first set, since these Ubers 40 do not contain any reserved portions 41.

In step 230, DW-aware rebuild manager 46 delays a rebuild of each degraded Uber 40 of the second set (i.e., Ubers 40 that do contain at least one reserved portion 41) until all pending DW write commands 50 to blocks of that degraded Uber 40 have been mapped by the MMS 54. Step 230 may include sub-steps 240, 250, 260, 270 for each Uber 40(X) of the second set.

In sub-step 240, DW-aware rebuild manager 46 prevents any new DW write commands 50 from being routed to any portions 41 of that degraded Uber 40(X).

In sub-step 250, for pending DW write commands 50 that are in the process of being persisted to any reserved portion 41 on that degraded Uber 40(X), DW-aware rebuild manager 46 finished persisting those DW write commands 50. For example, in sub-step 252, DW-aware rebuild manager 46 directs DW manager 44 to write to the blocks of the reserved portion 41 of that degraded Uber 40(X) (i.e., to a reserved portion 41 on that degraded Uber 40(X)) as in sub-step 150 of method 100. Then, in sub-step 254, DW-aware rebuild manager 46 directs DW manager 44 to insert descriptors 74 that point to those blocks into the NVM 70 as in sub-step 160 of method 100. As with sub-steps 150, 160, in some embodiments, sub-step 252 may be performed in parallel with or concurrently with sub-step 254.

In sub-step 260, once all the in-process DW write commands 50 aimed at a particular reserved portion 41(Y) on that degraded Uber 40(X) have been persisted, DW-aware rebuild manager 46 directs DW manager 44 to create metadata (e.g., MD entries 56) describing the blocks stored on that particular reserved portion 41(Y) using information from the descriptors 74, and inserting the metadata into the MMS 54, as in step 190 of method 100.

In sub-step 270, once sub-step 260 has been completed for all reserved portions 41 on that degraded Uber 40(X), DW-aware rebuild manager 46 initiates a rebuild of that Uber 40(X). In some embodiments, performing the rebuild of that degraded Uber 40(X) includes rebuilding segments 42 of that degraded Uber 40(X) with reference to the segment-level bitmaps 58 respectively included within the respective metadata entries 56 created for those segments 42. Thus, rebuilding segment 42(1) with reference to the segment-level bitmap 58 includes rebuilding data of the segment 42(1) that is assigned to a drive 39(a) of the RAID array of that segment 42(1) indicated by the segment-level bitmap 58 (e.g., "100" as in the example above) using data of that segment 42(1) that is assigned to other drives 39(b), 39(c) of the RAID array of that segment 42(1) that are not indicated by the segment-level bitmap 58.

Thus, techniques for implementing a rebuild process 200 that is able to work properly with data that was written in a turbo direct write mode have been presented. This result may be accomplished, at least in part, by identifying (step 210) degraded portions 41 of persistent storage 38 that were used for direct writing and delaying rebuilding (sub-step 270) those degraded portions 41 until such portions 41 are flushed (sub-step 260) to create mapping metadata 56 for those portions 41. Meanwhile, other degraded portions 41 of persistent storage 38 that were not used for direct writing may be rebuilt without delay (step 220). In some embodiments, a bitmap 76 may be created for every write to long-term persistent storage 38. The bitmap 76 identifies which drives 39 were in a degraded state at the time of writing (sub-step 154) and may be stored (sub-step 165) in conjunction with the descriptors 74 in the non-volatile memory 70. Several of these bitmaps 76 can then be logically combined in the creation of the metadata during the flushing process (step 190).

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

The word "each," when used in conjunction with members of a "set," means that each and every member of the set has a particular feature, but there may be additional similar items that are not members of the set and do not have the particular feature. Thus, for example, the statement that "each of a set of devices is blue" means that for a particular set of devices, each of those devices is blue, but it does not mean to exclude the possibility that there are additional devices not in the set that are not blue.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of rebuilding data in a data storage system, the method comprising:
    identifying (i) a first set of degraded Ubers that contain no portions reserved for direct writing and (ii) a second set of degraded Ubers that contain at least one portion reserved for direct writing, wherein direct writing is a process that writes blocks to long-term storage prior to mapping those blocks in a metadata mapping structure, wherein:
        an Uber is a set of adjacent stripes across a respective Redundant Array of Independent Disks (RAID) array of the data storage system, and
        a degraded Uber is an Uber that includes at least one failed drive within its RAID array;
    initiating a rebuild of the first set of degraded Ubers; and
    delaying a rebuild of each degraded Uber of the second set until all pending direct writes to blocks of that degraded Uber have been mapped by the metadata mapping structure.

2. The method of claim 1 wherein delaying includes:
    preventing new direct writes from being routed to that degraded Uber;
    for pending direct writes to blocks of a reserved portion of that degraded Uber that have not yet been persisted, persisting the pending direct writes by writing to the blocks of the reserved portion of that degraded Uber and inserting descriptors that point to those blocks into non-volatile memory of the data storage system;
    creating metadata describing those blocks using information from the descriptors, and inserting the metadata into the metadata mapping structure; and
    performing a rebuild of that degraded Uber after inserting metadata into the metadata mapping structure for all blocks of that degraded Uber.

3. The method of claim 2 wherein:
    writing to the blocks of the reserved portion of that degraded Uber includes writing into fixed-size segments, including writing to each segment with at least two write operations at different times, each segment being striped across the RAID array of that degraded Uber;
    inserting descriptors into non-volatile memory for blocks within a segment of the reserved portion of that degraded Uber includes:
        placing a pointer to the segment and an offset within the segment into the descriptor, and
        placing, into the non-volatile memory, bitmaps that respectively indicate which drives of the RAID array of that degraded Uber were degraded at the time of each write operation; and
    creating metadata describing those blocks includes creating a metadata element for each segment that (a) points to blocks of that segment and (b) includes a segment-level bitmap, wherein creating the segment-level bitmap includes logically OR-ing together the bitmaps for the write operations to that segment.

4. The method of claim 3 wherein:
    each write operation writes to a fixed number of blocks of a segment; and
    placing the bitmaps into the non-volatile memory includes distributing each bitmap across the fixed number of descriptors in the non-volatile memory that correspond to a single write operation.

5. The method of claim 3 wherein performing the rebuild of that degraded Uber includes rebuilding segments of that degraded Uber with reference to the segment-level bitmaps respectively included within the respective metadata elements created for those segments.

6. The method of claim 5 wherein rebuilding segments with reference to the segment-level bitmaps includes rebuilding data of a segment that is assigned to a drive of the RAID array of that segment indicated by the segment-level bitmap using data of that segment that is assigned to other drives of the RAID array of that segment that are not indicated by the segment-level bitmap.

7. The method of claim 2 wherein the method further comprises:
    reserving one or more portions for direct writing, each portion being a fixed fraction of an Uber and including a plurality of fixed-size segments, each segment being striped across the RAID array of that Uber; and
    directly writing to a portion reserved for direct writing, including, in response to receiving a write command to write a set of data to storage:
        writing a first subset of the set of data to a first set of blocks of a segment of the reserved portion in a first write operation while none of the drives of the RAID array of the Uber of the segment are degraded;
        writing a second subset of the set of data to a second set of blocks of the segment of the reserved portion in a second write operation while one of the drives of the RAID array of the Uber of the segment is degraded; and
        inserting descriptors into the non-volatile memory for the first and second sets of blocks, including:
            placing a pointer to the segment and an offset within the segment at which each block of the first and second sets is located into each descriptor, respectively;
            placing, into the non-volatile memory, a first bitmap that indicates that none of the drives of the RAID array of the Uber of the segment were degraded when the first set of blocks was written; and
            placing, into the non-volatile memory, a second bitmap that indicates which one of the drives of the RAID array of the Uber of the segment was degraded when the second set of blocks was written.

8. The method of claim 7 wherein the method further comprises:
    in response to the reserved portion being filled, inserting a metadata element for each segment of the reserved portion into the metadata mapping structure, the metadata element for each segment (a) pointing to blocks of that segment and (b) including a segment-level bitmap created by logically OR-ing together bitmaps for each of a plurality of write operations to that segment; and
    in response to inserting the metadata element for all segments of the reserved portion into the metadata mapping structure, marking the reserved portion as no longer being reserved.

9. The method of claim 7 wherein reserving the one or more portions for direct writing includes reserving a first portion for direct writing by a first processing node of the data storage system and a second portion for direct writing by a second processing node of the data storage system.

10. A data storage system comprising:
long-term persistent storage including a plurality of Redundant Array of Independent Disks (RAID) arrays; and
processing circuitry coupled to memory configured to rebuild data of the data storage system by:
identifying (i) a first set of degraded Ubers that contain no portions reserved for direct writing and (ii) a second set of degraded Ubers that contain at least one portion reserved for direct writing, wherein direct writing is a process that writes blocks to long-term storage prior to mapping those blocks in a metadata mapping structure, wherein:
an Uber is a set of adjacent stripes across a respective RAID array of the data storage system, and
a degraded Uber is an Uber that includes at least one failed drive within its RAID array;
initiating a rebuild of the first set of degraded Ubers; and
delaying a rebuild of each degraded Uber of the second set until all pending direct writes to blocks of that degraded Uber have been mapped by the metadata mapping structure.

11. The data storage system of claim 10 wherein:
the data storage system further comprises non-volatile memory; and
delaying includes:
preventing new direct writes from being routed to that degraded Uber;
for pending direct writes to blocks of a reserved portion of that degraded Uber that have not yet been persisted, persisting the pending direct writes by writing to the blocks of the reserved portion of that degraded Uber and inserting descriptors that point to those blocks into the non-volatile memory;
creating metadata describing those blocks using information from the descriptors, and inserting the metadata into the metadata mapping structure; and
performing a rebuild of that degraded Uber after inserting metadata into the metadata mapping structure for all blocks of that degraded Uber.

12. The data storage system of claim 11 wherein:
writing to the blocks of the reserved portion of that degraded Uber includes writing into fixed-size segments, including writing to each segment with at least two write operations at different times, each segment being striped across the RAID array of that degraded Uber;
inserting descriptors into non-volatile memory for blocks within a segment of the reserved portion of that degraded Uber includes:
placing a pointer to the segment and an offset within the segment into the descriptor, and
placing, into the non-volatile memory, bitmaps that respectively indicate which drives of the RAID array of that degraded Uber were degraded at the time of each write operation; and
creating metadata describing those blocks includes creating a metadata element for each segment that (a) points to blocks of that segment and (b) includes a segment-level bitmap, wherein creating the segment-level bitmap includes logically OR-ing together the bitmaps for the write operations to that segment.

13. The data storage system of claim 12 wherein:
each write operation writes to a fixed number of blocks of a segment; and
placing the bitmaps into the non-volatile memory includes distributing each bitmap across the fixed number of descriptors in the non-volatile memory that correspond to a single write operation.

14. The data storage system of claim 12 wherein performing the rebuild of that degraded Uber includes rebuilding segments of that degraded Uber with reference to the segment-level bitmaps respectively included within the respective metadata elements created for those segments.

15. The data storage system of claim 14 wherein rebuilding segments with reference to the segment-level bitmaps includes rebuilding data of a segment that is assigned to a drive of the RAID array of that segment indicated by the segment-level bitmap using data of that segment that is assigned to other drives of the RAID array of that segment that are not indicated by the segment-level bitmap.

16. The data storage system of claim 11 wherein the processing circuitry coupled to memory is further configured to:
reserve one or more portions for direct writing, each portion being a fixed fraction of an Uber and including a plurality of fixed-size segments, each segment being striped across the RAID array of that Uber; and
directly write to a portion reserved for direct writing, including, in response to receiving a write command to write a set of data to storage:
writing a first subset of the set of data to a first set of blocks of a segment of the reserved portion in a first write operation while none of the drives of the RAID array of the Uber of the segment are degraded;
writing a second subset of the set of data to a second set of blocks of the segment of the reserved portion in a second write operation while one of the drives of the RAID array of the Uber of the segment is degraded; and
inserting descriptors into the non-volatile memory for the first and second sets of blocks, including:
placing a pointer to the segment and an offset within the segment at which each block of the first and second sets is located into each descriptor, respectively;
placing, into the non-volatile memory, a first bitmap that indicates that none of the drives of the RAID array of the Uber of the segment were degraded when the first set of blocks was written; and
placing, into the non-volatile memory, a second bitmap that indicates which one of the drives of the RAID array of the Uber of the segment was degraded when the second set of blocks was written.

17. The data storage system of claim 16 wherein the processing circuitry coupled to memory is further configured to:
in response to the reserved portion being filled, insert a metadata element for each segment of the reserved portion into the metadata mapping structure, the metadata element for each segment (a) pointing to blocks of that segment and (b) including a segment-level bitmap created by logically OR-ing together bitmaps for each of a plurality of write operations to that segment; and
in response to inserting the metadata element for all segments of the reserved portion into the metadata mapping structure, mark the reserved portion as no longer being reserved.

18. The data storage system of claim 16 wherein reserving the one or more portions for direct writing includes reserving a first portion for direct writing by a first processing node of the data storage system and a second portion for direct writing by a second processing node of the data storage system.

19. A computer program product comprising a non-transitory computer-readable storage medium storing instructions, which, when performed by processing circuitry of a data storage system, cause the data storage system to rebuild data by:
- identifying (i) a first set of degraded Ubers that contain no portions reserved for direct writing and (ii) a second set of degraded Ubers that contain at least one portion reserved for direct writing, wherein direct writing is a process that writes blocks to long-term storage prior to mapping those blocks in a metadata mapping structure, wherein:
  - an Uber is a set of adjacent stripes across a respective Redundant Array of Independent Disks (RAID) array of the data storage system, and
  - a degraded Uber is an Uber that includes at least one failed drive within its RAID array;
- initiating a rebuild of the first set of degraded Ubers; and
- delaying a rebuild of each degraded Uber of the second set until all pending direct writes to blocks of that degraded Uber have been mapped by the metadata mapping structure.

20. The computer program product of claim 19 wherein delaying includes:
- preventing new direct writes from being routed to that degraded Uber;
- for pending direct writes to blocks of a reserved portion of that degraded Uber that have not yet been persisted, persisting the pending direct writes by writing to the blocks of the reserved portion of that degraded Uber and inserting descriptors that point to those blocks into non-volatile memory of the data storage system;
- creating metadata describing those blocks using information from the descriptors, and inserting the metadata into the metadata mapping structure; and
- performing a rebuild of that degraded Uber after inserting metadata into the metadata mapping structure for all blocks of that degraded Uber.

* * * * *